Feb. 10, 1942.   F. G. MAJER   2,272,305
IMPULSE DRIVE MECHANISM
Filed Sept. 7, 1940   2 Sheets-Sheet 1

Inventor
Frank G. Majer
By Paul O. Pippel
Atty.

Feb. 10, 1942. F. G. MAJER 2,272,305
IMPULSE DRIVE MECHANISM
Filed Sept. 7, 1940 2 Sheets-Sheet 2

Inventor
Frank G. Majer
By Paul O. Pippel
Atty.

Patented Feb. 10, 1942

2,272,305

UNITED STATES PATENT OFFICE 2,272,305

IMPULSE DRIVE MECHANISM

Frank G. Majer, Berwyn, Ill., assignor to International Harvester Company, a corporation of New Jersey Application September 7, 1940, Serial No. 355,775

11 Claims. (Cl. 171—209)

This invention relates to an impulse drive mechanism for the starting system of an internal combustion engine and is adapted to be associated with the engine magneto in the usual manner.

An important object of the invention is the provision of an improved impulse drive mechanism incorporating as a feature thereof the disposition of the winding spring in such a manner that, upon rotation of the driving member of the mechanism, the friction between that member and the spring is eliminated, resulting in a more efficient operation of the mechanism.

Another important object of the invention is the provision of a compact organization of parts in which a peripheral wall of the driving member encloses the driven member and the release mechanism carried by the latter.

Still another object is the provision of the driving means for the spring mechanism in a manner providing for an improved recoil action after the driven member is released.

Other important objects and more specific features of the invention will become apparent as the disclosure is more fully made.

Figure 1:
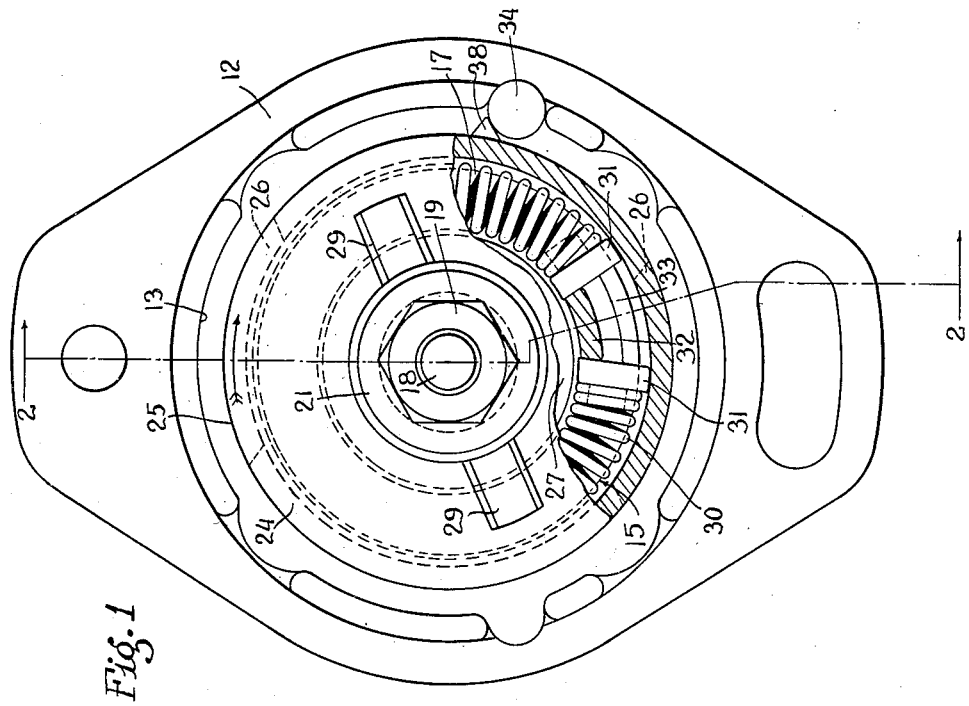
Figure 1 is a face view of the improved construction, with portions thereof broken away to show the driving lugs for the winding spring.

The particular form of construction illustrated is adapted to be associated in the usual manner with the armature shaft of a magneto forming part of the ignition system of the internal combustion engine. To this end, there is shown a shaft 10 on which the armature of the magneto is carried, the armature and the remainder of the magneto structure being omitted from the drawings. The shaft is carried in suitable bearings and extends through an opening 11 formed centrally in a bracket or support 12, which may be bolted to the internal combustion engine in any suitable manner. The outer or forward face of the support 12 is formed with a cylindrical recess 13.

The outer end of the shaft 10 is tapered and provided with a keyway carrying a key 14 for the purpose of securing to the shaft for rotation therewith a driven member 15 comprising a part of the impulse drive mechanism. This member includes a central hub 16 and a radial circular wall 17. The extreme end portion of the shaft 10 is reduced, as at 18, and the portion of the hub 16 surrounding that shaft part is recessed internally to receive a nut 19 which is threaded on the shaft portion 18 and which has an enlarged outer end abutting against a pair of washers 20 and 21. The washer 21 is sufficiently large to overlie the end of the hub 16 of the member 15 and is adapted to retain in place a driving member 22 comprising another part of the impulse drive mechanism. The member 22 includes a central hub or sleeve 23 journaled on the hub 16 of the member 15. The member 22 further includes an outer radial wall 24 and an integral annular or peripheral wall 25 extending axially inwardly toward the support 11 and encircled by the recess 13 of the support. The inner end portion of the annular wall 25 extends axially inwardly of and encircles the radial wall 17 on the driven member 15. The inner periphery of the annular wall 25 includes integrally therewith a pair of diametrically opposed arcuate cams 26, the purpose of which will presently appear. These cams are shown best in Figure 3.

The hub or sleeve 23 of the driving member 22 is surrounded by a cupped washer 27 preferably filled with lubricant retaining packing 28. The lubricant retained in this packing serves to lubricate the members 15 and 22, those members having limited relative rotation, as will hereinafter appear. The outer face of the radial wall 24 of the driving member 22 is provided with a pair of diametrically opposed cranking lugs 29, engageable by a starting member, not shown, in the usual manner.

The disposition of and relation between the driving and driven members 22 and 15 is such as to provide an annular pocket between the radial walls 17 and 24, encircled by the annular wall 25 and further defined by the annular portion of the washer 27. Within this annular pocket is disposed a compressible resilient means in the form of a coiled or helical spring 30, the axis of the spring lying on a circle concentric of the annular wall 25 of the driving member 22. The coil diameter is substantially uniform throughout, and is slightly less than the radial distance between the wall 25 and the outer wall of the washer 27. The opposite ends of the spring are spaced apart by a pair of members in the form of buttons 31 and a pair of driving lugs 32 and 33. Each button 31 consists of a main body portion and a reduced portion fitted within the end coils of the respective end of the spring 30. The outer face of each abutment is preferably flat. The spring, in its most usual form consists of a straight coiled spring, bent to annular form and assembled in the annular pocket. Such construction, while desirable from many stand-points is attended with one problem—the creation of friction between a portion of the spring and a portion of the driving member. According to the present invention, this friction is eliminated at those points where its occurrence was formerly most pronounced.

Figure 2:
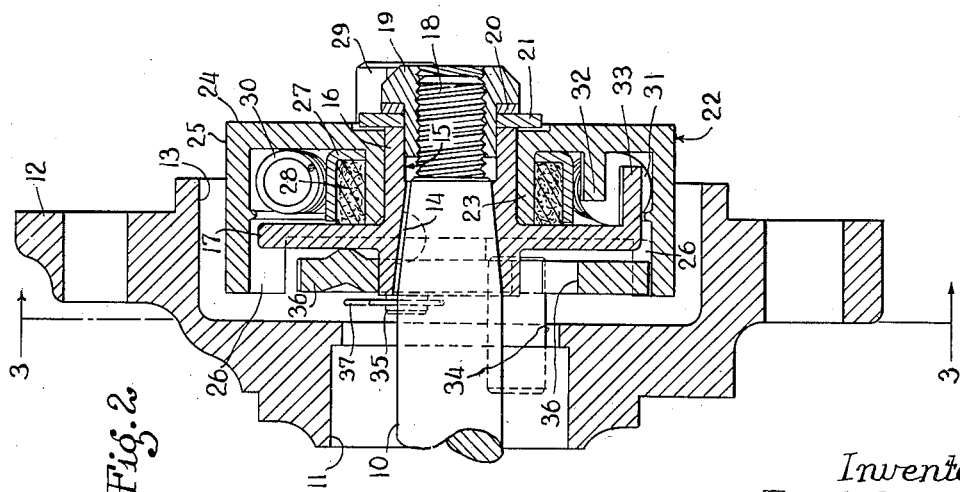
Figure 2 is a longitudinal sectional view taken substantially on the line 2—2 of Figure 1.

The lug 32 is formed integral with the driving member 22 and, as best shown in Figure 2, extends axially inwardly from the inner face of the radial wall 24. This lug is disposed at a point radially inwardly of the circular axis of the spring 30, so that one end of the lug engages one button 31 at a point adjacent the periphery of the button, the other end of the lug similarly abutting the other button 31 at the other end of the spring 30. The other lug 33 is preferably formed integral with the driven member 15, extending axially outwardly from the radial wall 17 of that member. Opposite ends of the lug 33 respectively engage the buttons 31 at points spaced radially outwardly of the circular axis of the spring 30. It will be noted that the lugs are arcuate in extent and that the opposite ends thereof lie respectively on the sides of a triangle having its apex disposed adjacent the axis of the shaft 10. It will be noted further that the triangle referred to is not exactly a segment of the circle defined by the annular wall 25 of the driving member 22, but that the arrangement is such that the flat faces of the buttons 31 do not lie on radii of the circle mentioned. This arrangement tilts the faces of the buttons 31 so that the initial force is applied to the opposite ends of the springs to urge the outer peripheries of the coils of the spring away from the inner periphery of the annular wall 25 of the driving member 22. More important is the location of the lug 33 on the driven member 15. This lug engages the right-hand end of the spring (as viewed in Figure 1) at a point spaced radially outwardly of the axis of the spring, the application of the force exerted on the spring tending to tighten the spring about the washer 27 rather than to urge the spring outwardly into contact with the inner periphery of the annular wall 25. The arrangement is such as to eliminate friction between the outer periphery of the spring and the inner periphery of the wall 25, the details of which will hereinafter more fully appear. As previously stated, the arcuate extent of the lugs 32 and 33 are substantially coextensive within the confines of the imaginary triangle defining the same. Thus, opposite ends of both lugs respectively engage the flat faces of the buttons 31 at points lying respectively on the lines forming the aforesaid triangle. The lugs are thus substantially coextensive and overlap to contribute materially to a more efficient recoil action of the spring when the driven member is released. A more detailed description of the operation of the device in this respect will appear below.

Figure 3:
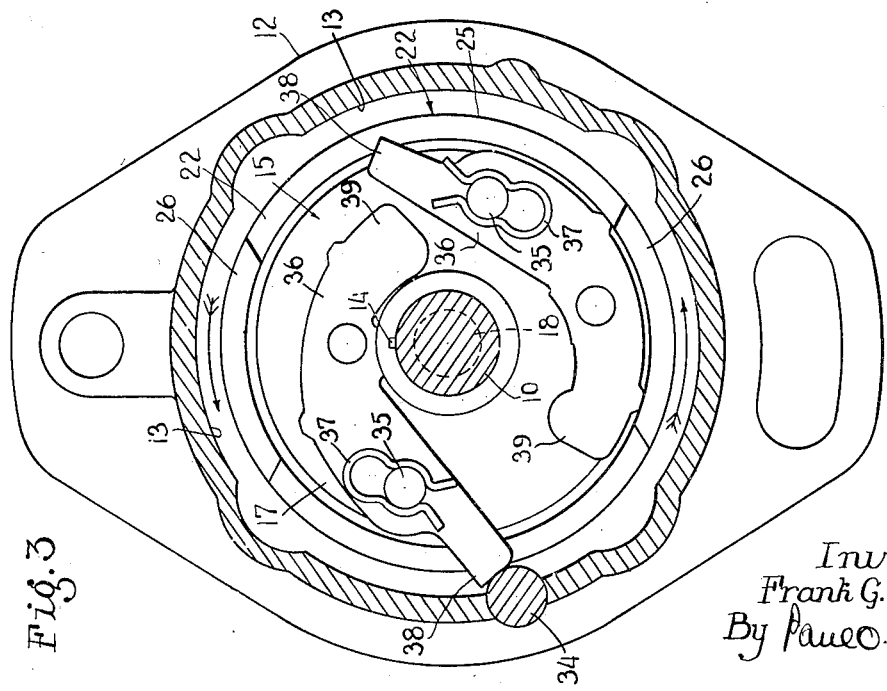
Figure 3 is a rear view of the device taken substantially along the line 3—3 of Figure 2.

As best shown in Figure 3, the support 12 is provided with a stop in the form of a pin 34, which extends partially into the cylindrical recess 13 of the support. The inner face of the radial wall 17 on the driven member 15 carries a pair of diametrically opposed pins 35. Each pin 35 has pivotally mounted thereon a latch or pawl member 36, the members being held in place by clips 37. Each member 36 consists of an engaging portion 38 and a weighted tail portion 39. Each member is so pivoted on the respective pin 35 that its weighted end, when the member is above center, tends to urge the engaging end 38 of the member into position to engage the stop 34 on the support 12. Centrifugal force, when the driven member 15 is rotating, overcomes the weight of the members and keeps the engaging ends of the members out of engaging position.

As shown in Figure 2, the members 36 are substantially enclosed within or encircled by the inner end portion of the annular wall 25 of the driving member 22, this wall cooperating with the radial wall 17 to provide a second annular pocket.

Figure 4:
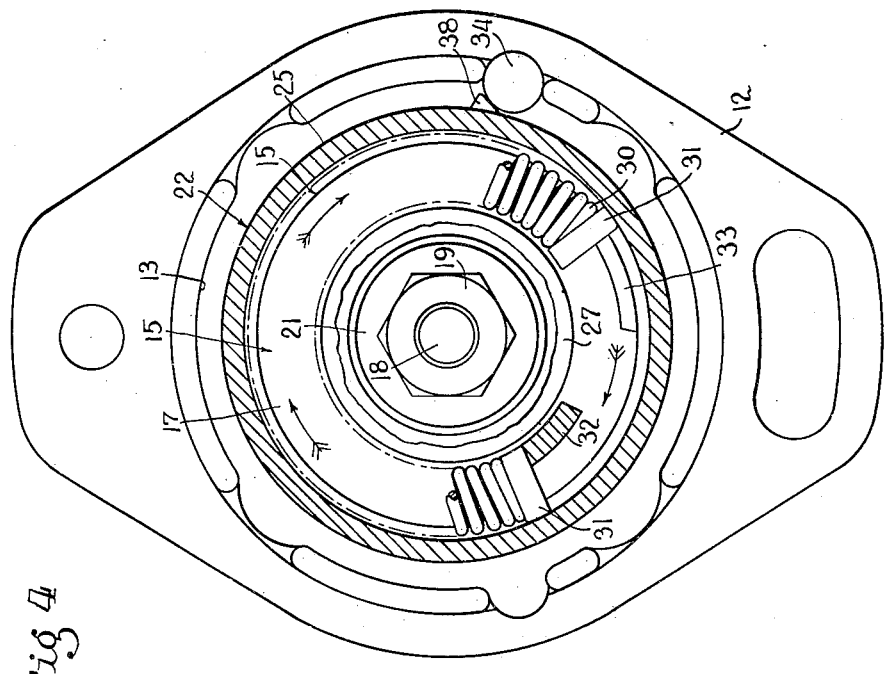
Figure 4 is a view similar to that shown in Figure 1, illustrating the relative positions of the driving and driven members when the spring is compressed.

In the operation of the device, the parts initially assume the positions illustrated in Figures 1, 2, and 3. As shown particularly in Figure 1, the spring 30 is uncompressed, the buttons 31 engaging the opposite ends of the lugs 32 and 33. Upon the slightest rotation of the driving member in a clockwise direction, as indicated by the arrow in Figure 1, one of the pawl members 36 will pivot on its pin 35, so that its end 38 engages the stop 34 on the support 12. Continued rotation of the driving member 22 occurs while the driven member remains stationary because of the engagement between the stop 34 and one of the pawls 36. During this continued rotation of the driving member, the lug 32 moves the left-hand end of the spring, as viewed in Figure 1, in a clockwise direction, so that the spring is compressed to the extent indicated in Figure 4. The lug 33, being formed as part of the driven member 15, remains in position and abuts the other end of the spring 30. During this rotation of the driving member, the end of the spring engaged by the lug 32 is compressed only an inappreciable amount. It will be noted, as a matter of fact, that this end of the spring in effect moves with, and not with respect to, the driving member. The other end of the spring, however, remaining held by the lug 33, reflects the compression taking place and, since this end of the spring remains stationary, it will be seen that the driving member moves relative thereto. A difficulty experienced at this point in the operation—that is, friction between the driving member and the spring—especially at the right-hand side of the assembly, is eliminated according to the present invention. The disposition of the lug 33 is such as to prevent the spring from buckling outwardly against the annular wall 25 of the driving member. The spring is instead urged radially away from this wall and friction between the parts at these points is eliminated.

As the driving member is rotated, the cam member 26 approaches the end 38 of the member 36 which is now engaged with the stop 34. Continued rotation of the driving member causes the cam to engage the end of the pawl 36 to disengage the end 38 thereof from the stop. The driven member then springs forward in a clockwise direction, rotating the armature shaft 10 therewith. An impulse has thus been imparted to the armature shaft. The lugs 32 and 33 again quickly assume the positions originally occupied and return to these positions with considerable force as the spring 30 is released. Since the arcuate extents of the lugs 32 and 33 are substantially coextensive, as previously described, the free ends of the lugs simultaneously engage the face 31, and the recoil action is balanced. Rotation of the driving member through another half turn causes the other pawl 26 to become engaged with the stop 34, the alternate engagement between pawls 36 and the stop 34 taking place automatically as the engine is cranked. The operation is repeated throughout until the engine starts, after which time centrifugal force keeps the pawl 36 out of engagement with the stop 34.

From the foregoing description of the construction and operation of the device, it will be seen that an improved impulse driving mechanism has been provided for the purposes of achieving the objects set forth above. Other objects and features will be apparent to those skilled in the art. It will be understood, of course, that only a preferred embodiment of the invention has been illustrated and described and that numerous modifications and alterations may be made therein without departing from the spirit and scope of the invention as defined in the appended claims.

What is claimed is:

1. In an impulse drive mechanism including coaxial driven and driving members adapted for limited relative rotation, the driving member including a radial wall spaced axially from the driven member and an outer peripheral flange extending toward the driven member, the combination with the members of resilient force-transmitting means comprising a compressible coiled spring in the form of an annulus disposed between the members and encircled by the peripheral flange of the driving member, opposite ends of the spring being disposed in closely spaced relation, a lug on the driven member engaging the one end of the spring to impart force to the end of the spring only at a point outwardly of the axis of the spring, and a lug on the driving member engaging the other end of the spring to impart force to the end of the spring only at a point radially inwardly of the axis of the spring.

2. In an impulse drive mechanism including coaxial driven and driving members adapted for limited relative rotation, the members being spaced axially apart and one having an outer peripheral flange extending toward the other member to form an annular pocket, the combination with the members of resilient force-transmitting means comprising a compressible coiled spring disposed in the annular pocket and having its opposite ends closely spaced apart, a lug on the driven member engaging the one end of the spring to impart force to the end of the spring only at a point outwardly of the axis of the spring, and a lug on the driving member engaging the other end of the spring to impart force to the end of the spring only at a point radially inwardly of the axis of the spring.

3. In an impulse drive mechanism including coaxial driven and driving members adapted for limited relative rotation, the members being spaced axially apart and one having an outer peripheral flange extending toward the other member to form an annular pocket, the combination with the members of resilient force-transmitting means comprising a compressible coiled spring in the form of an annulus disposed in the annular pocket and having its opposite ends closely spaced apart, a lug on the driven member engaging one end of the spring at a point outwardly of the axis of the spring, and a lug on the driving member engaging the other end of the spring at a point radially inwardly of the axis of the spring, the first lug also normally abutting the end of the spring engaged by the second lug and the second lug normally abutting the end of the spring engaged by the first lug.

4. In an impulse drive mechanism including coaxial driven and driving members adapted for limited relative rotation, the members being spaced axially apart and one having an outer peripheral flange extending toward the other member to form an annular pocket, the combination with the members of resilient force-transmitting means comprising a compressible coiled spring in the form of an annulus disposed in the annular pocket and having its opposite ends closely spaced apart, a lug on the driven member engaging one end of the spring at a point outwardly of the axis of the spring, a lug on the driving member engaging the other end of the spring at a point radially inwardly of the axis of the spring, an abutting portion on the driven member abutting the end of the spring engaged by the lug on the driving member, and an abutting portion on the driving member abutting the end of the spring engaged by the lug on the driven member.

5. In an impulse drive mechanism comprising, in combination with a magneto shaft and support, a driven member keyed to the shaft and having a radial wall including inner and outer faces, a driving member carried on the shaft for limited rotation with respect to the driven member, said driving member having a radial wall spaced axially from the outer face of the radial wall of the driven member and an annular wall extending axially past and encircling the radial wall of the driven member to form annular pockets at both sides of the last-named radial wall, a stop on the support adjacent the driven member, a member pivoted intermediate its ends on the inner face of the radial wall of the driven member at a point spaced from the shaft and having one end engageable with the stop and the other end weighted for normally moving said member toward stop-engaging position, a cam portion on the inner periphery of the annular wall of the driving member adapted upon limited rotation of said member to engage the pivoted member to disengage the latter from the stop, a compressible coiled spring in the form of an annulus disposed in the annular pocket at the outer side of the radial wall of the driven member and having its ends spaced apart, and two lugs carried respectively by the driving and driven members within said annular pocket, the lug on the driving member engaging one end of the spring to impart force to the end of the spring only at a point radially inwardly of the spring axis, the other lug engaging the other end of the spring to impart force to the end of the spring only at a point radially outwardly of the spring axis.

6. In an impulse drive mechanism comprising, in combination with a magneto shaft and support, a driven member keyed to the shaft and having a radial wall, a driving member carried on the shaft for limited rotation with respect to the driven member, said driving member having a radial wall spaced axially from the radial wall of the driven member and an annular wall extending axially past and encircling the radial wall of the driven member to form an annular pocket between the radial walls, a stop on the support adjacent the driven member, a member pivoted intermediate its ends on the radial wall of the driven member and having one end engageable with the stop and the other end weighted for normally moving said member toward stop-engaging position, a cam portion on the driving member adapted upon limited rotation of said member to engage the pivoted member to disengage the latter from the stop, a compressible coiled spring in the form of an annulus disposed in the annular pocket and having its ends spaced apart, and two lugs carried respectively by the driving and driven members within said annular pocket, the lug on the driving member engaging one end of the spring to impart force to the end of the spring only at a point radially inwardly of the spring axis, the other lug engaging the other end of the spring to impart force to the end of the spring only at a point radially outwardly of the spring axis.

7. In an impulse drive mechanism comprising driving and driven members, the former having an annular channel formed therein including an outer annular wall, the combination with said members of a compressible coiled spring disposed in the annular pocket and having its ends closely spaced apart, a pair of buttons carried respectively by the ends of the spring and having flat faces opposed, a lug carried by the driving member and engaging one button to apply force to the spring along a line extending outwardly toward the annular wall of the driving member, and a lug carried by the driven member and engaging the other button to apply force to the spring along a line extending inwardly away from said annular wall.

8. In an impulse drive mechanism comprising driving and driven members, the former having an annular channel formed therein including an outer annular wall, the combination with said members of a compressible coiled spring disposed in the annular pocket and having its ends closely spaced apart, a lug carried by the driving member located to engage one end of the spring only at a point radially outwardly of the center of the coils, and a lug carried by the driven member and engaging the other end of the spring.

9. In an impulse drive mechanism comprising driving and driven members, the former having an annular channel formed therein including an outer annular wall, the combination with said members of a compressible coiled spring in the form of an annulus disposed in the annular pocket and having its ends closely spaced apart, means carried by the driving member and engaging one end of the spring, and means carried by the driven member and engaging the other end of the spring, whereby the spring is compressed between the first and second means upon limited rotation of the driving member with respect to the driven member, said second means engaging the end of the spring and exerting force thereon in a direction urging the compressing spring radially inwardly away from the annular wall of the driving member.

10. In an impulse drive mechanism comprising driving and driven members, the former having an annular channel formed therein including an outer annular wall, the combination with said members of a compressible coiled spring in the form of an annulus disposed in the annular pocket and having its ends closely spaced apart, a lug carried by the driving member and engaging one end of the spring to apply force to the spring along a line extending outwardly toward the annular wall of the driving member, and a lug carried by the driven member and engaging the other end of the spring to apply force to the spring along a line extending inwardly away from said annular wall.

11. In an impulse drive mechanism including coaxial driven and driving members adapted for limited relative rotation, the driving member including a radial wall spaced axially from the driven member and an outer peripheral flange extending toward the driven member, the driven member having an inner annular portion spaced radially inwardly of the peripheral flange on the driving member and cooperating with said flange to form an annular recess, the combination with the members of resilient force-transmitting means comprising a compressible coiled spring shaped to fit in the aforesaid annular recess and disposed between the members and encircled by the peripheral flange of the driving member, the spring coils being of substantially uniform diameter which is slightly less than the radial distance between the peripheral flange of the driving member and the aforesaid annular portion of the driven member, opposite ends of the spring being disposed in closely spaced relation, a lug on the driven member engaging one end of the spring to impart force to the end of the spring only at a point outwardly of the axis of the spring, and a lug on the driving member engaging the other end of the spring to impart force to the end of the spring only at a point radially inwardly of the axis of the spring.

FRANK G. MAJER.